United States Patent [19]

Fujimoto et al.

[11] Patent Number: 4,795,591
[45] Date of Patent: Jan. 3, 1989

[54] PROCESS FOR THE PREPARATION OF GRAPHITE INTERCALATION COMPOUND AND NOVEL GRAPHITE INTERCALATION COMPOUND

[75] Inventors: Kenichi Fujimoto; Maki Sato; Tsutomu Sugiura, all of Kawasaki, Japan

[73] Assignee: Nippon Steel Corporation, Japan

[21] Appl. No.: 171,188

[22] Filed: Mar. 18, 1988

Related U.S. Application Data

[63] Continuation of Ser. No. 42,279, Apr. 24, 1987, abandoned.

[30] Foreign Application Priority Data

May 13, 1986 [JP] Japan .................................. 61-107632

[51] Int. Cl.$^4$ .......................... C01B 31/02; H01B 1/06
[52] U.S. Cl. .................... 252/506; 252/502; 252/507; 252/508; 252/509; 423/445; 423/449; 423/458; 556/140; 556/170
[58] Field of Search .............. 252/502, 503, 506, 507, 252/508, 509; 423/449, 458; 556/43, 52, 58, 64, 112, 121, 140, 170

[56] References Cited

U.S. PATENT DOCUMENTS

| | | |
|---|---|---|
| 4,369,170 | 1/1983 | Watanabe et al. ................... 252/502 |
| 4,565,649 | 1/1986 | Vogel .................................. 252/506 |
| 4,604,276 | 8/1986 | Oblas et al. ......................... 252/506 |
| 4,608,192 | 8/1986 | Su ....................................... 252/506 |
| 4,632,775 | 12/1986 | Kalnin et al. ....................... 252/507 |
| 4,642,201 | 2/1987 | Vogel .................................. 252/506 |
| 4,663,144 | 5/1987 | McQuillan et al. ................. 252/503 |
| 4,729,884 | 3/1988 | Sugiura et al. ..................... 252/506 |

FOREIGN PATENT DOCUMENTS

2946414 5/1981 Fed. Rep. of Germany ...... 252/506
6114870 9/1981 Japan .................................. 252/506

OTHER PUBLICATIONS

Physical Review B, vol. 25, p. 4583, 1982.
Bulletin Am. Phys. Soc., vol. 21, p. 262, 1976.
Glossary of Lectures for the 11th Annual Meeting of the Carbon Society of Japan, p. 42, 1984.
Synthetic Metals, vol. 3, p. 1, 1981.
Solid State Ionics, vol. 9 and 10, 1983.
Angewandte Chemie, vol. 75, No. 2, 1963, pp. 130–136; Rudorff et al.: "Reaktionen des Graphits mit Metallchloriden".
Chemical Abstracts, vol. 90, No. 22, May 28, 1979, p. 746, Abstract No. 179422X.
J.C.S. Chem. Comm., No. 19, 1980, pp. 890–891, Letchworth, GB; E. M. McCarron et al.: "Fluorogermanium (IV) salts of graphite. A system in equilibrium with elemental fluorine".

*Primary Examiner*—Asok Pal
*Attorney, Agent, or Firm*—Parkhurst, Oliff & Berridge

[57] ABSTRACT

A graphite intercalation compound enjoying high stability is produced by a method characterized by using a previously synthesized acceptor type graphite intercalation compound as a raw material and intercalating therein a substance different from the substance intercalated in the graphite intercalation compound and capable of forming an acceptor type graphite intercalation compound.

The representative substance to the newly intercalated in the production mentioned above is a metal halide selected from the group consisting of ferric chloride, cupric chloride, aluminum chloride, cobalt chloride, nickel chloride, calcium chloride, barium chloride, silver chloride, zinc chloride, zirconium chloride, molybdenum chloride, tantalum chloride, and hafnium chloride.

6 Claims, No Drawings

PROCESS FOR THE PREPARATION OF GRAPHITE INTERCALATION COMPOUND AND NOVEL GRAPHITE INTERCALATION COMPOUND

This is a continuation of application Ser. No. 042,279 filed Apr. 24, 1987 now abandoned.

BACKGROUND OF THE INVENTION

1. Field of the Invention

This invention relates to a novel process for the production of a graphite intercalation compound and to a novel, heretofore synthetically unattainable graphite intercalation product.

More particularly, this invention relates to a method for the production of a graphite intercalation compound, which, by using a previously synthesized graphite intercalation compound as a raw material in the synthesis of the graphite intercalation compound aimed at, enables the time required for the synthesis to be notable shortened and confers upon the produced compound a structure unattainable by the conventional technique of synthesis and to a graphite intercalation compound possessing a novel intercalate.

2. Description of the Prior Art

The term "stage number" is used in specifically expressing the periodic superlattice structure of a graphite intercalation compound. This "stage number" indicates how often, in the graphite layers of a given graphite intercalation compound, those graphite layer surfaces carrying thereon the intercalate (otherwise known as "intercalant") regularly occur as expressed in terms of the number of intervening layers. For example, the "first stage" represents the case in which the intercalate is present on every graphite layer surface, the "second stage" represents the case in which the intercalate is present on every second graphite layer surface, and the third stage or more can be expressed in the same way. The term "stage structure" is used in referring generally to the graphite intercalation compound structures in which the intercalate is present periodically from the superlattice point of view.

The graphite intercalation compounds have been demonstrated to retain the chemical stability inherent in graphite and, at the same time, possess as high electroconductivity as metals. Thus, numerous studies are now under way on these compounds.

These studies have so far unveiled the fact that the graphite intercalation compounds have the qualities thereof determined by the particular kinds of intercalates present therein.

The graphite intercalation compounds are conveniently classified into acceptor type graphite intercalation compounds, donor type graphite intercalation compounds, and covalent bond type graphite intercalation compounds, depending on the kinds of substances intercalated therein.

The term "acceptor type graphite intercalation compound" refers generally to graphite intercalation compounds of a type such that substances intercalated therein are present between graphite layers in the form accepting electrons from graphite. For example, those graphite intercalation compounds which contain ferric chloride, cupric chloride, aluminum chloride, cobalt chloride, cupric bromide, bromine, etc. as their intercalates belongs to this type.

In contrast, graphite intercalation compounds of a type such that substances intercalated therein are present between graphite layers in the form donating electrons to graphite are generally referred to as the term "donor type graphite intercalation compound." Examples of this type are those graphite intercalation compounds which contain potassium, lithium, rubidium, cesium, etc. as their intercalates.

Graphite intercalation compounds of a type such that substances intercalated therein share covalent bonds with graphite such as graphite fluoride are generally referred to as the term "covalent bond type graphite intercalation compound."

In the donor type graphite intercalation compounds, those which use alkali metals such as, for example, potassium as their intercalates are found to possess improved electroconductivity but lack stability in the air. Thus, they are immediately decomposed when they are exposed to the air (Physical Review B., Vol. 25, p. 4583, 1982). It is reported that a graphite intercalation compound using antimony pentafluoride as its intercalate exhibits better electroconductivity than elementary copper. This compound similarly lacks stability in the air and, therefore, has a problem yet to be solved for the purpose of practical adoption (Bulletin of American Physical Society, Vol. 21, p. 262, 1976).

Those acceptor type graphite intercalation compounds which use metal chlorides, for example, as their intercalates possess electroconductivity nearly equivalent to the electroconductivity of most metals, though not superior to that of elementary copper, and retain stability even in the air. Particularly the graphite intercalation compound using cupric chloride as its intercalate is stable not only in the air but also in water. However, for cupric chloride to be intercalated into graphite, the reaction proceeds so slowly that some tens of days are required for completion of the reaction (Glossary of Lectures for the 11th Annual Meeting of the Carbon Society of Japan, p. 42, 1982). Because of the slowness of this reaction, quantity production of this particular species of compound proves to be substantially difficult.

Further, during the intercalation of nickel chloride between layers of graphite, the reactivity of this intercalation s greatly affected by the reaction temperature. When the reaction temperature is not higher than 500° C., for example, it takes several weeks to several months for the reaction to be completed. Furthermore in this case, the chemical composition and structure of the graphite intercalation compound synthesized at any temperature in the range of 495° to 690° C. are equal. Even if the intercalation is effected at a temperature outside the range mentioned above, no more nickel chloride can be intercalated between layers of graphite than when the reaction is performed at a temperature in the range. The stage structure in this case is invariably that of the second stage. By this method, therefore, graphite intercalation compounds of the first stage obtained by many graphite intercalation compounds having metal chlorides such as, for example, ferric chloride or cupric chloride intercalated therein can not be obtained (Synthetic Metal, Vol. 3, p. 1, 1981).

It is reported that, during the intercalation of nickel chloride between layers of graphite, the synthesis carried out in such a manner that the chlorine pressure is kept about 7 kg/cm² under the reaction conditions gives birth to a graphite intercalation compound possessing the first stage structure (Solid State Ionics, Vol. 9 and 10, 1983). This synthesis lacks feasibility by reason of safety because the reaction conditions involved are harsh particularly in the sense that chlorine, a highly corrosive gas, must be used at elevated temperatures under high pressure.

No successful production of a graphite intercalation compound using calcium chloride, barium chloride, or silver chloride as its intercalate has been reported in the art.

SUMMARY OF THE INVENTION

The inventors continued a diligent study aimed at eliminating the drawbacks on graphite intercalation compounds of the prior art as described above thereby shortening the time required for the reaction in the synthesis of a graphite intercalation compound using a metal halide as an intercalate and realizing synthesis of a graphite intercalation compound possessing the first stage structure unattainable under the conventional reaction conditions. Consequently they have learnt the fact that the reaction velocity can be heightened by using a preparatorily synthesized graphite intercalation compound as a raw material for the reaction and the fact that the reaction using this raw material permits successful synthesis of a graphite intercalation compound possessing the first stage structure. The present invention has been perfected as the result.

An object of this invention is to provide a process which, in the production of a graphite intercalation compound using a metal halide such as, for example, cupric chloride, nickel chloride, aluminum chloride, cobalt chloride, cupric bromide, nickel bromide, or cobalt bromide as an intercalate therefor, permits a reduction in the heretofore inevitable and detestably lengthy reaction time.

Another object of this invention is to provide a process for the preparation of a graphite intercalation compound possessing the first stage structure mainly and having as an intercalate therefor such a metal halide as nickel chloride which has been heretofore synthesized only under the condition of high pressure.

Yet another object of this invention is to provide a novel graphite intercalation compound having calcium chloride, barium chloride, or silver chloride intercalated therein.

DETAILED DESCRIPTION OF THE PREFERRED EMBODIMENT

This invention is directed to a process for the preparation of a graphite intercalation compound, characterized by using as a raw material an acceptor type graphite intercalation compound having previously intercalated in graphite a first intercalate different from a second intercalate intended for use in the compound aimed at and causing this acceptor type graphite intercalation compound to react with the second intercalate thereby effecting intercalation of the second intercalate between graphite layers. This invention is further directed to a new graphite intercalation compound.

To be specific, in the preparation of a graphite intercalation compound containing a metal halide such as, for example, ferric chloride, cupric chloride, aluminum chloride, cobalt chloride, nickel chloride, calcium chloride, barium chloride, silver chloride, zinc chloride, zirconium chloride, molybdenum chloride, tantalum chloride, hafnium chloride, cupric bromide, nickel bromide, or cobalt bromide as an intercalate, the process of this invention contemplates using as a raw material therefor an acceptor type graphite intercalation compound having preparatorily intercalated therein a substance different from the intercalate desired to be inserted in the product aimed at.

The acceptor type graphite intercalation compound to be used as a raw material for the present invention is a graphite intercalation compound of a type such that the intercalated substance is present between layers of graphite in the form of accepting electron from graphite. Concrete examples of the acceptor type graphite intercalation compound are graphite intercalation compounds having ferric chloride, cupric chloride, aluminum chloride, cobalt chloride, cupric bromide, or bromine as intercalates thereof.

In this case, two different substances are used as the first and second intercalates. The production is desirably carried out, for example, by using first intercalate of a low reaction temperature in the preparatory synthesis of graphite intercalation compound and then substituting the first intercalate with a second intercalate having a higher reaction temperature than the first intercalate. The metal chlorides, enumerated in the decreasing order of reaction temperature, are nickel chloride, cobalt chloride, cupric chloride, ferric chloride, and aluminum chloride. Where a graphite intercalation compound of nickel chloride is desired to be produced, a graphite intercalation compound having cobalt chloride intercalate therein is used as the raw material.

Of course, the reaction of intercalation proceeds to some extent when one and the same substance is used as the first and the second intercalates. In this case, however, the reaction velocity is low and it is difficult to produce a graphite intercalation compound of the first stage structure. The production of a desired graphite intercalation compound by the method of this invention is accomplished by charging a reaction vessel with a preparatorily synthesized graphite compound as a raw material and a metal halide as an intercalate to be used in the product aimed at and heating the reactants to a temperature approximately in the range of 200° to 700° C. under an atmosphere of chlorine or under the autogenous pressure to induce reaction. The reaction pressure is not more than 2 kg/cm$^2$, more generally not more than 1 kg/cm$^2$.

Preparatorily syntesized graphite intercation compound as a raw material means an acceptor type graphite intercalation compound which is obtained by intercalating a varying metal halide or a halogen by the conventional method in a varying graphite such as powdered natural graphite, sheetlike swelled graphite, artificial graphite, or graphite fibers known to permit production of a graphite intercalation compound.

The stage structure of the graphite intercalation compound thus used as the raw material need not be specifically defined. While a species of the first stage structure can be used, a species possessing the second through sixth stage structure or a mixture of them is used more advantageously. This is because, when the stage number of the graphite intercalation compound used as the raw material is smaller than the aforementioned range, the intercalate coming from the layer surfaces of the graphite intercalation compound as the raw material during the course of the reaction elevates the internal pressure of the reaction vessel possibly to the extent of jeopardizing the safety of operation and the intercalate thus issuing from the graphite intercalation compound as the raw material mixes in a large amount into the product possibly to the extent of rendering difficult the control of characteristic qualities of the product.

When the stage number of the graphite intercalation compound used as the raw material is larger than the aforementioned range, the reaction velocity is not heightened so much as expected.

By heating the reaction vessel containing these raw materials to a temperature approximately in the range of 200° to 700° C., though depending upon the kind of metal chloride being used, the graphite intercalation compound aimed at can be produced.

The present invention, by using a preparatorily synthesized graphite intercalation compound as a raw material and then causing this compound to react with an intercalate intended for incorporation in the product aimed at, enables the reaction velocity to be notably heightened and, at the same time, permits synthesis of a graphite intercalation compound possessing the stage structure which has never been attained under the reaction conditions by the conventional process.

The detailed mechanism responsible for the reaction involved in the synthesis contemplated by the present invention has not been fully elucidated. It may possibly ascribe to the fact that the attraction between the layer surfaces of the graphite, a factor held to be detrimental to the intercalation of a metal halide in the layer surfaces of graphite, is remarkably weakened by the intercalate previously present and the fact that the intercalate thus existing preparatorily between the layers of graphite donates electric charge to the layer of graphite and consequently activates the reaction of intercalation of the metal halide between the layers.

An attempt to produce a graphite intercalation compound by using graphite as raw material and calcium chloride, barium chloride, or silver chloride as an intercalate for insertion in the product aimed at the following the method of the conventional process has proved futile.

The graphite intercalation compound, however, is successfully obtained by using a preparatorily synthesized graphite intercalation compound as a raw material and following the method of this invention.

Now, the present invention will be described more concretely below with reference to examples.

EXAMPLE 1

Synthesis of a graphite intercalation compound using cobalt chloride as an intercalate was effected by using as a raw material a previously synthesized graphite intercalation compound of cupric chloride of a second stage structure and causing this compound to react with cobalt chloride.

The amounts of the raw materials used for the synthesis were 1 g of the graphite intercalation compound of cupric chloride of the second stage structure and 2 g of the cobalt chloride. The reaction temperature was 480° C. and the reaction time was one day. The formation of the graphite intercalation compound was confirmed by measurement of the X-ray diffraction.

The results of the reaction indicate successful intercalation of 1.0 g of cobalt chloride per g of graphite, representing a generous increase in the amount of intercalation as compared with the amount attainable under the reaction conditions used by the conventional method. No unaltered graphite was detected. When the reaction was repeated using graphite as a raw material and the same reaction conditions as described above, the amount of cobalt chloride intercalated was only 0.30 g per g of graphite. The greater part of graphite was seen to retain its unaltered structure.

EXAMPLE 2

Synthesis of a graphite intercalation compound having nickel chloride intercalated in powdered graphite was effected by using as a raw material a previously synthesized a second-stage or third-stage graphite intercalation compound of cupric chloride and causing this compound to react with nickel chloride.

The amounts of the raw materials thus used were 1 g of the second-stage or third-stage graphite intercalation compound of cupric chloride and 2 g of nickel chloride. The reaction temperature was 580° C. and the reaction time was one day. The formation of the graphite was confirmed by measurement of the X-ray diffraction. The results are shown in Table 1. The same reaction was carried out by following the procedure described above, except that powdered graphite was used as a raw material. The results of this comparative experiment are also shown in the same table.

It is understood from the table that while the reaction product using the powdered graphite as raw material had a second-stage structure, the product obtained by using the graphite intercalation compound having cupric chloride previously intercalated therein as raw material possessed a first-stage structure.

It has been known that in the reaction system for intercalation of nickel chloride into graphite, a graphite intercalation compound possessing a second-stage structure is formed under the conditions mentioned above. The present invention, by using a previously synthesized graphite intercalation compound of cupric chloride as a raw material, permits easy synthesis of a first-stage graphite intercalation compound of nickel chloride which has heretofore been synthesized only under the reaction conditions of high temperature and high pressure.

EXAMPLE 3

Synthesis of a graphite intercalation compound having cobalt chloride intercalated in powdered graphite was effected by using as a raw material a previously synthesized second-stage graphite intercalation compound of bromine and causing this compound to react with cobalt chloride.

The amounts of the raw materials used for the reaction were 1 g of the second-stage graphite intercalation compound of bromine and 2 g of the cobalt chloride. The reaction temperature was 500° C. an the reaction time was one day. The formation of the graphite intercalation compound was confirmed by measurement of the X-ray diffraction.

The results of the reaction indicate successful intercalation of 0.7 g of cobalt chloride per g of graphite, representing a generous increase in the amount of intercalation as compared with the amount attainable under the reaction conditions used by the conventional method. No unreacted graphite was detected. When the same reaction was carried out by following the procedure described above, except that graphite was used as a raw material, the amount of cobalt chloride intercalated was only 0.3 g per g of graphite. The greater part of graphite was seen to retain its unaltered structure.

EXAMPLES 4-6

Synthesis of a graphite intercalation compound having a desired intercalate (A) inserted in powdered graphite was effected by using as a raw material a varying previously synthesized graphite intercalation compound (B) and causing this compound to react with the intercalate (A).

The amounts of the raw materials used for the reaction were 1 g of the graphite intercalation compound (B) and 2 g of the intercalate (A). The reaction temperature was (C) °C. and the reaction time was (D) days. The reaction was carried out under an atmosphere of chlorine. The formation of the graphite intercalation compound was confirmed by measurement of the X-ray diffraction. The results of the reaction indicate successful intercalation of (E) g of the substance (A) per g of graphite. When the reaction was carried out by following the procedure described above, except that graphite was used as a raw material, absolutely no intercalation of the substance (A) was obtained. These working examples demonstrate that the method of this invention permits successful intercalation of metal chlorides which the conventional method has failed to intercalate. The reaction conditions an the results are shown in Table 2.

EXAMPLES 7-11

Synthesis of a graphite intercalation compound having a desired intercalate (A) inserted in powdered graphite was effected by using as a raw material a varying previously synthesized graphite intercalation compound (B) and causing this compound to react with the intercalate (A).

The amounts of the raw materials used for the reaction were 1 g of the graphite intercalation compound (B) and 2 g of the intercalate (A). The reaction temperature was (C) °C. and the reaction time was (D) days. The reaction was carried out under an atmosphere of chlorine. The formation of the graphite intercalation compound was confirmed by measurement of the X-ray diffraction and elementary analysis.

The results of the test indicate successful intercalation of (E) g of the substance (A) per g of graphite, representing a generous increase in the amount of an intercalate. No unaltered graphite was detected.

When the reaction was carried out by following the procedure described above, except that graphite was used as raw material, only (F) g of the substance (A) was intercalated per g of graphite. The greater part of graphite was seen to retain its unaltered structure. The reaction conditions and the results of the test are shown in Table 3.

This invention provides a method which, in the production of a graphite intercalation compound having a metal chloride as an intercalate, permits a remarkable reduction in the conventionally inevitable and detestably lengthy reaction time. It also provides a method which permits effective synthesis under mild conditions of a graphite intercalation compound having intercalated therein a metal chloride of high concentration, i.e. a compound heretofore synthesized only under harsh conditions.

The invention, therefore, brings about the effect of shortening the heating time required during the course of the reaction and consequently permitting a saving in the energy consumption. Since it permits graphite intercalation compounds having high levels of intercalation to be synthesized under mild reaction conditions as compared with the conventional method, it serves the purpose of improving the working environment.

TABLE 1

| Intercalate | Raw material | Stage number | Amounts of nickel chloride (g)/g of graphite | |
|---|---|---|---|---|
| Nickel chloride | Intercalation compound of cupric chloride (Second stage) | 1 | 1.1 | The present invention |
| Nickel chloride | Intercalation compound of cupric chloride (Third stage) | 1 | 1.1 | The present invention |
| Nickel chloride | Powdered graphite | 2 | 1.70 | Comparative example |

TABLE 2

| Example | Intercalate (A) | Intercalation compound (B) | Temp (C.) | Time (D) | Amounts intercalated (E) |
|---|---|---|---|---|---|
| 4 | Calcium chloride | Cupric chloride Second stage | 600° C. | 3 days | 0.03 g |
| 5 | Barium chloride | Cupric chloride Second stage | 550° C. | 3 days | 0.02 g |
| 6 | Silver chloride | Cupric chloride Second stage | 550° C. | 10 days | 0.15 g |

TABLE 3

| | | | | | Amounts intercalated | |
|---|---|---|---|---|---|---|
| Example | A | B | C (°C.) | D (days) | E (g) | F (g) |
| 7 | Zirconium chloride | Cupric chloride Second stage | 400 | 3 | 0.22 | 0.10 |
| 8 | Zinc chloride | Cupric chloride Second stage | 550 | 3 | 0.71 | 0.08 |
| 9 | Molibdenum chloride | Aluminum chloride Second stage | 200 | 3 | 0.10 | 0.01 |
| 10 | Tantalum chloride | Aluminum chloride Second stage | 220 | 20 | 0.08 | 0.02 |

TABLE 3-continued

| Example | A | B | C (°C.) | D (days) | Amounts intercalated E (g) | F (g) |
|---------|---|---|---------|----------|----------------------------|-------|
| 11 | Hafnium chloride | Cupric chloride Second stage | 400 | 10 | 0.19 | 0.12 |

What is claimed is:

1. A process for the preparation of a graphite intercalation compound, characterized by using a previously synthesized acceptor type graphite intercalation compound as a raw material and intercalating therein a metal halide capable of forming an acceptor type graphite intercalation compound, said metal halide selected from the group consisting of cobalt chloride, nickel chloride, calcium chloride, barium chloride, silver chloride, zinc chloride, zirconium chloride, molybdenum chloride, tantalum chloride and hafnium chloride.

2. The process according to claim 1, wherein said metal halide is selected from the group consisting of cobalt chloride, nickel chloride, calcium chloride, barium chloride and silver chloride.

3. The process according to claim 2, wherein said metal halide is selected from the group consisting of cobalt chloride and nickel chloride.

4. A novel graphite intercalation compound having calcium chloride intercalated in the graphite layer thereof.

5. A novel graphite intercalation compound having barium chloride intercalated in the graphite layer thereof.

6. A novel graphite intercalation compound having silver chloride intercalated in the graphite layer thereof.

* * * * *